US011093516B2

(12) United States Patent
Cheung et al.

(10) Patent No.: US 11,093,516 B2
(45) Date of Patent: Aug. 17, 2021

(54) SYSTEMS AND METHODS FOR DATA TYPE IDENTIFICATION AND ADJUSTMENT

(71) Applicant: Microsoft Technology Licensing, LLC, Redmond, WA (US)

(72) Inventors: Chairy Chiu Ying Cheung, Redmond, WA (US); Taurean Addair Jones, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 15/270,396

(22) Filed: Sep. 20, 2016

(65) Prior Publication Data

US 2018/0081923 A1 Mar. 22, 2018

(51) Int. Cl.
*G06F 16/24* (2019.01)
*G06F 16/2458* (2019.01)

(52) U.S. Cl.
CPC .............. *G06F 16/2462* (2019.01)

(58) Field of Classification Search
CPC ..... Y10S 707/99943; Y10S 707/99935; Y10S 707/99934; G06F 17/30569
USPC ................................................ 707/755, 781
See application file for complete search history.

(56) References Cited

U.S. PATENT DOCUMENTS

| 5,708,828 | A | * | 1/1998 | Coleman | H04L 29/06 715/205 |
| 6,745,176 | B2 | | 6/2004 | Probert, Jr. et al. | |
| 7,149,745 | B2 | * | 12/2006 | Janssen | G06F 17/30569 707/781 |
| 7,155,665 | B1 | * | 12/2006 | Browne | G06F 17/246 715/243 |
| 7,886,264 | B1 | | 2/2011 | Peyton et al. | |
| 8,619,090 | B2 | | 12/2013 | Spada et al. | |
| 8,745,580 | B2 | | 6/2014 | Nathan et al. | |
| 9,031,956 | B2 | * | 5/2015 | Baker | G06F 17/30386 707/740 |
| 2002/0069193 | A1 | | 6/2002 | Beavin et al. | |
| 2002/0161754 | A1 | * | 10/2002 | Janssen | G06F 17/30569 |

(Continued)

OTHER PUBLICATIONS

Singh, et al., "Transforming Spreadsheet Data Types using Examples", in Proceedings of the 43rd Annual ACM SIGPLAN-SIGACT Symposium on Principles of Programming Languages, Jan. 20, 2016, pp. 343-356.

(Continued)

*Primary Examiner* — Pierre M Vital
*Assistant Examiner* — Andrew N Ho
(74) *Attorney, Agent, or Firm* — Ray Quinney & Nebeker P.C; James Bullough

(57) ABSTRACT

A system includes an operating system executed by a processor and memory. A data type identifier changing application is executed by the operating system and is configured to display a table including data entries that are arranged in rows and columns and that include data type identifiers. The data type identifier changing application is configured to generate a list including two or more of the data type identifiers corresponding to rows in a selected column. The data type identifier changing application is configured to change one of the data type identifiers in the list corresponding to a plurality of rows in the selected column to one of another one of the data type identifiers in the list or a data type identifier that is not in the list.

20 Claims, 9 Drawing Sheets

(56) References Cited

U.S. PATENT DOCUMENTS

| | | | | |
|---|---|---|---|---|
| 2003/0135485 | A1* | 7/2003 | Leslie | G06F 16/2462 |
| 2004/0015515 | A1* | 1/2004 | Beisiegel | G06F 8/51 |
| 2005/0102303 | A1* | 5/2005 | Russell | G06F 16/211 |
| 2005/0240614 | A1* | 10/2005 | Barsness | G06F 16/2462 |
| 2007/0233648 | A1* | 10/2007 | Zuzarte | G06F 16/2462 |
| 2007/0256043 | A1 | 11/2007 | Peters et al. | |
| 2008/0301137 | A1* | 12/2008 | Bauman | G06Q 10/109 |
| 2009/0024551 | A1* | 1/2009 | Agrawal | G06N 5/02 706/47 |
| 2012/0313953 | A1* | 12/2012 | Owen | G06F 17/246 345/581 |
| 2014/0330827 | A1* | 11/2014 | Wu | G06F 16/285 707/737 |
| 2016/0140116 | A1* | 5/2016 | Li | G06F 16/214 707/609 |
| 2016/0147796 | A1 | 5/2016 | Ardila et al. | |
| 2017/0154082 | A1* | 6/2017 | Michel | G06F 16/22 |

OTHER PUBLICATIONS

Stirk, Ian., "Quickly Identify Columns with Mismatched Data Types", Published on: Jan. 21, 2009 Available at: http://sqlmag.com/t-sql/quickly-identify-columns-mismatched-data-types.

Kandel, et al., "Wrangler: Interactive Visual Specification of Data Transformation Scripts". 10 pages; Dated May 7-12, 2011, Copyright 2011.

* cited by examiner

FIG. 6

| ID | Employee | Cust | | | | Freight | City | Country |
|---|---|---|---|---|---|---|---|---|
| 10248 | Craig Lee | Erns | 342-1 | String (12 | Integer 346-1 | 2.38 | Reims | France |
| 10249 | James Brown | Erns | 342-2 | | Date/Time 346-2 | 38 | Reims | France |
| 10258 | Bruce Via | Erns | | | Other 346-X | 38 | Reims | France |
| 10448 | Pedro Jones | Erns | | Integer (500) | | $32.38 | Reims | France |
| 10348 | Joann Lee | Erns | | | | $32.38 | Reims | France |
| 10248 | Wade Heninger | Erns | | | | $32.38 | Reims | France |
| 10748 | Christina Storm | Erns | 342-3 | Date/Time (23) | | $32.38 | Reims | France |
| 10288 | North West | Erns | | | | $32.38 | Reims | France |
| 10258 | Sky Blue | Ernst Handel - Roland Mendel | 11/2/1996 | Federal Shipping | | $32.38 | Reims | France |
| 10278 | Tim Via | Ernst Handel - Roland Mendel | 11/2/1996 | Federal Shipping | | $32.38 | Reims | France |
| 10228 | David Via | Ernst Handel - Roland Mendel | 11/2/1996 | Federal Shipping | | $32.38 | Reims | France |
| 10248 | Teresa Elton | Ernst Handel - Roland Mendel | 11/2/1996 | Federal Shipping | | $32.38 | Reims | France |
| 10228 | Jimmy Blades | Ernst Handel - Roland Mendel | 11/2/1996 | Federal Shipping | | $32.38 | Reims | France |

340 — Customer
300, 310, 355, 342-1, 342-2, 342-3, 346-1, 346-2, 346-X

FIG. 7

| ID | Employee | Cust | | | Freight | City | Country |
|---|---|---|---|---|---|---|---|
| 10248 | Craig Lee | Erns | 342-4 | | $32.38 | Reims | France |
| 10249 | James Brown | Erns | | | $32.38 | Reims | France |
| 10258 | Bruce Via | Erns | | | $32.38 | Reims | France |
| 10448 | Pedro Jones | Erns | | | $32.38 | Reims | France |
| 10348 | Joann Lee | Erns | Integer (621) | | $32.38 | Reims | France |
| 10248 | Wade Heninger | Erns | | | $32.38 | Reims | France |
| 10748 | Christina Storm | Erns | | | $32.38 | Reims | France |
| 10288 | North West | Erns | 342-3 | Date/Time (23) | $32.38 | Reims | France |
| 10258 | Sky Blue | Ernst Handel - Roland Mendel | 11/2/1996 | Federal Shipping | $32.38 | Reims | France |
| 10278 | Tim Via | Ernst Handel - Roland Mendel | 11/2/1996 | Federal Shipping | $32.38 | Reims | France |
| 10228 | David Via | Ernst Handel - Roland Mendel | 11/2/1996 | Federal Shipping | $32.38 | Reims | France |
| 10248 | Teresa Elton | Ernst Handel - Roland Mendel | 11/2/1996 | Federal Shipping | $32.38 | Reims | France |
| 10228 | Jimmy Blades | Ernst Handel - Roland Mendel | 11/2/1996 | Federal Shipping | $32.38 | Reims | France |
| 10248 | Young Green | Ernst Handel - Roland Mendel | 11/2/1996 | Federal Shipping | $32.38 | Reims | France |

340 — Customer
300, 310, 342-4, 342-3

FIG. 8

| ID | Employee | Cus| | | | Freight | City | Country |
|---|---|---|---|---|---|---|---|---|
| 10248 | Craig Lee | Erns | | | ng | $32.38 | Reims | France |
| 10249 | James Brown | Erns | | | ng | $32.38 | Reims | France |
| 10258 | Bruce Via | Erns | 342-4 | | ng | $32.38 | Reims | France |
| 10448 | Pedro Jones | Erns | | | ng | $32.38 | Reims | France |
| 10348 | Joann Lee | Erns | Integer (621) | | ng | $32.38 | Reims | France |
| 10248 | Wade Heninger | Erns | | | ng | $32.38 | Reims | France |
| 10748 | Christina Storm | Erns | | | | | | France |
| 10288 | North West | Erns | 342-3 Date/Time (23) | 350 Integer | | | | France |
| | | | | Other 346-X | | | | |
| 10258 | Sky Blue | Ernst Handel - Roland Mendel | 11/2/1996 | Federal Shipping | $32.38 | Reims | France |
| 10278 | Tim Via | Ernst Handel - Roland Mendel | 11/2/1996 | Federal Shipping | $32.38 | Reims | France |
| 10228 | David Via | Ernst Handel - Roland Mendel | 11/2/1996 | Federal Shipping | $32.38 | Reims | France |
| 10248 | Teresa Elton | Ernst Handel - Roland Mendel | 11/2/1996 | Federal Shipping | $32.38 | Reims | France |

Customer — 340, 310, 300

FIG. 9

Customer — 340, 310, 300

| ID | Employee | Cus | 342-5 | | | Freight | City | Country |
|---|---|---|---|---|---|---|---|---|
| 10248 | Craig Lee | Erns | | | ng | $32.38 | Reims | France |
| 10249 | James Brown | Erns | | | ng | $32.38 | Reims | France |
| 10258 | Bruce Via | Erns | | | ng | $32.38 | Reims | France |
| 10448 | Pedro Jones | Erns | Integer (644) | | ng | $32.38 | Reims | France |
| 10348 | Joann Lee | Erns | | | ng | $32.38 | Reims | France |
| 10248 | Wade Heninger | Erns | | | ng | $32.38 | Reims | France |
| 10748 | Christina Storm | Erns | | | ng | $32.38 | Reims | France |
| 10288 | North West | Erns | | | ng | $32.38 | Reims | France |
| 10258 | Sky Blue | Ernst Handel - Roland Mendel | 11/2/1996 | Federal Shipping | $32.38 | Reims | France |
| 10278 | Tim Via | Ernst Handel - Roland Mendel | 11/2/1996 | Federal Shipping | $32.38 | Reims | France |
| 10228 | David Via | Ernst Handel - Roland Mendel | 11/2/1996 | Federal Shipping | $32.38 | Reims | France |
| 10248 | Teresa Elton | Ernst Handel - Roland Mendel | 11/2/1996 | Federal Shipping | $32.38 | Reims | France |
| 10228 | Jimmy Blades | Ernst Handel - Roland Mendel | 11/2/1996 | Federal Shipping | $32.38 | Reims | France |
| 10248 | Young Green | Ernst Handel - Roland Mendel | 11/2/1996 | Federal Shipping | $32.38 | Reims | France |
| 10248 | Craig Lee | Ernst Handel - Roland Mendel | 11/2/1996 | Federal Shipping | $32.38 | Reims | France |

[Figure 14: A table (300) with columns ID, Employee, Cust... Freight, City, Country showing entries like 10248 Craig Lee, 10249 James Brown, 10258 Bruce Via, 10448 Pedro Jones, 10348 Joann Lee, 10248 Wade Heninger, 10748 Christina Storm, 10288 North West, 10258 Sky Blue, 10278 Tim Via, 10228 David Via, 10248 Teresa Elton, 10228 Jimmy Blades — with Ernst Handel - Roland Mendel, 11/2/1996, Federal Shipping, $32.38, Reims, France. Overlay (310) labeled "Customer" (340) with identifiers 342-1 String (12), 342-2, 342-3 Date/Time (23), Integer (500), and menu (355) with Integer 346-1, Date/Time 346-2, Other 346-X, Samples 346-S.]

FIG. 15

[Figure 15: Same as FIG. 14 with an additional callout (450) pointing from Samples showing text: "Sample of data entries in some or all rows with the selected data type identifier".]

SYSTEMS AND METHODS FOR DATA TYPE IDENTIFICATION AND ADJUSTMENT

FIELD

The present disclosure relates to systems and methods for changing data type identifiers in columns of tables.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Data wrangling typically involves extracting raw data from a data source and sorting, transforming and/or formatting the raw data. The data may be loaded into one or more tables. Each of the tables may be used to store related types of data (such as employee data, customer addresses, sales data, etc.) using a fixed number of columns and a variable number of rows. Data wrangling may also involve normalization, which is the process of organizing the columns and tables of a relational database to reduce data redundancy and improve data integrity.

Each column in a table usually includes related types of data. Examples of related types of data that may appear in the columns of a sales-related table include customer name, product identification, quantity sold, sales price, etc. Users may assign a data type identifier to the data in each row of the column. The data type identifiers for each entry in the table may be stored as metadata associated with the data entries in each row/column location. Examples of data type identifiers include text, numerical data type identifiers (such as integer or more complex number formats), logical data type identifiers (such as Boolean), date and time data type identifiers, etc. Data type identifiers may also determine the types of operations that can be performed on the entry in a spreadsheet or database and help to determine the meaning of an entry (for example, a number in a row may be used to represent text, an amount, or a date depending on the data type identifier).

Data type mismatches occur when a column of a table includes one or more rows having different data type identifiers. In some situations, data wranglers may have various different types of data within a single column because users incorrectly imputed that data. A data quality bar is the primary mechanism for knowing whether the data type identifier is mismatched (in other words, by inference when some entries are valid, invalid, or unknown).

SUMMARY

A system includes an operating system executed by a processor and memory. A data type identifier changing application is executed by the operating system and is configured to a) display a table including data entries that are arranged in rows and columns and that include data type identifiers; b) generate a list including two or more of the data type identifiers corresponding to rows in a selected column; and c) change one of the data type identifiers in the list corresponding to a plurality of rows in the selected column to one of: another one of the data type identifiers in the list; or a data type identifier that is not in the list.

In other features, the data type identifier changing application generates row counts corresponding to a number of rows in the selected column having a corresponding one of the data type identifiers and displays the row counts in the list. The data type identifier includes data entities. At least one of the data entities is selected from a group consisting of an address, a social security number, a phone number, and a zip code.

In other features, the data type identifier changing application selectively repeats a), b) and c) until only one of the data type identifiers is associated with the selected column. The data type identifier changing application is configured as an add-in application to an application selected from a group consisting of a database application, a spreadsheet application, and a data wrangling application. The data type identifier changing application selectively displays sample data entries in rows of one of the data type identifiers in the list. The data type identifier changing application selectively displays a preview of changed data entries in rows corresponding to one of the data type identifiers in the list if the change is made.

In other features, the list is displayed in a dialog box including a plurality of command buttons corresponding to the data type identifiers. Each of the plurality of command buttons includes a text descriptor for a corresponding one of the data type identifiers. The text descriptor further includes a count of rows for the corresponding one of the data type identifiers.

A non-transitory, tangible computer-readable medium stores instructions for changing data type identifiers. The non-transitory, tangible computer-readable medium includes instructions for a) displaying a table including data entries that are arranged in rows and columns and that include data type identifiers; b) generating a list including two or more of the data type identifiers corresponding to rows in a selected column; and c) changing one of the data type identifiers in the list corresponding to a plurality of rows in the selected column to one of: another one of the data type identifiers in the list; or a data type identifier that is not in the list.

In other features, non-transitory, tangible computer-readable medium stores instructions for generating row counts corresponding to a number of rows in the selected column having a corresponding one of the data type identifiers; and displaying the row counts in the list.

In other features, the data type identifier includes data entities. At least one of the data entities is selected from a group consisting of an address, a social security number, a phone number, and a zip code.

In other features, non-transitory, tangible computer-readable medium stores instructions for allowing a user to repeat a), b) and c) until only one of the data type identifiers is associated with the selected column.

In other features, non-transitory, tangible computer-readable medium stores instructions for displaying the list of the data type identifiers in a dialog box including a plurality of command buttons corresponding to the data type identifiers in the list; generating text descriptors for each corresponding one of the data type identifiers in the list; and generating a count of rows for the corresponding one of the data type identifiers and displaying the count in the text descriptors for each corresponding one of the data type identifiers.

In other features, non-transitory, tangible computer-readable medium stores instructions for selectively displaying sample data entries in rows of one of the data type identifiers in the list.

In other features, non-transitory, tangible computer-readable medium stores instructions for selectively displaying a preview of changed data entries in rows corresponding to one of the data type identifiers in the list if the change is made.

A system comprises a processor and memory. An operating system is executed by the processor and memory. A data type identifier changing application is executed by the operating system and is configured to: a) display a table including data entries that are arranged in rows and columns and that include data type identifiers; b) generate a list including two or more of the data type identifiers corresponding to rows in a selected column; c) generate row counts corresponding to a number of rows in the selected column having a corresponding one of the data type identifiers and display the row counts along with the list of the data type identifiers; d) change one of the data type identifiers in the list corresponding to a plurality of rows in the selected column to one of another one of the data type identifiers in the list or a data type identifier that is not in the list; and e) selectively repeat a), b), c) and d) until only one of the data type identifiers is associated with the selected column.

In other features, the data type identifier includes data entities. At least one of the data entities is selected from a group consisting of an address, a social security number, a phone number, and a zip code. The data type identifier changing application is configured as an add-in application to an application selected from a group consisting of a database application, a spreadsheet application, and a data wrangling application.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 4-9 are screen shots illustrating example dialog boxes for changing the data type identifier of a column of a table.

FIGS. 12-13 are screen shots illustrating example dialog boxes for previewing data entries in rows of a selected column that are to be changed as if the change was made.

FIGS. 14-15 are screen shots illustrating example dialog boxes for showing a sample of data entries in rows of a selected column having a selected data type identifier.

In the drawings, reference numbers may be reused to identify similar and/or identical elements.

DESCRIPTION

The present disclosure relates to systems and methods for changing the data type identifier of groups of rows in a column of a table. The rows with the data type identifier that is to be changed do not need to be located in consecutive rows in the selected column. As used herein, the term data type identifier refers to traditional data type identifiers described above and/or data entities such as addresses, social security numbers, phone numbers, zip codes, etc. that have hybrid data formats or special data formats.

More particularly, the systems and methods described herein allow a user to select a column of a table and generate summary data to allow the user to understand the different data type identifiers assigned to rows within the selected column. In some examples, the summary also includes the number of rows in the selected column having the corresponding data type identifier. The systems and methods provide a user interface to allow the user to change the data type identifier of a group of rows in the selected column to a different data type identifier. As a result, data type mismatch in a column can be corrected.

Figure 1:
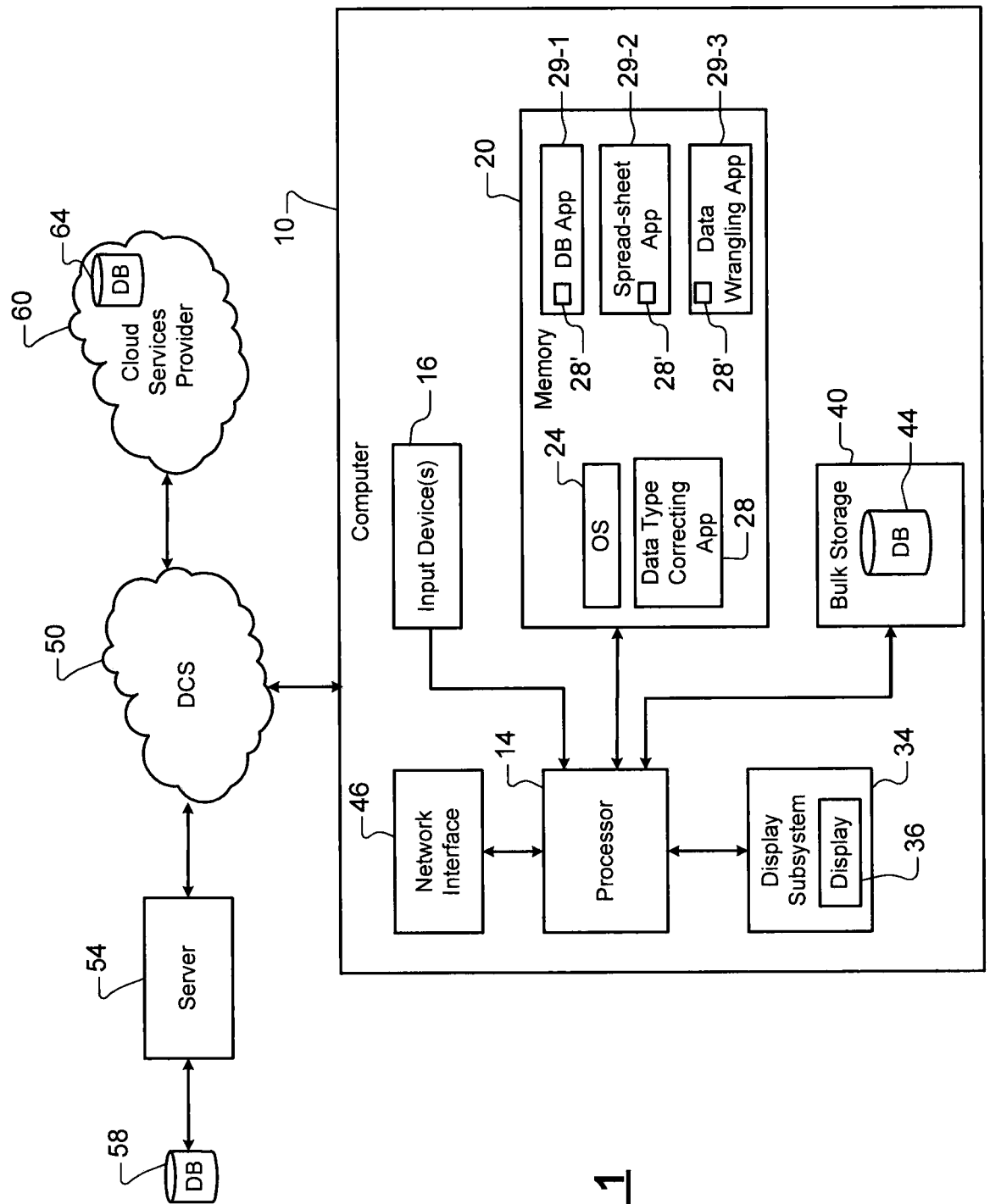
FIG. 1 is a functional block diagram showing a computer including a data type identifier correcting application according to the present disclosure.

Referring now to FIG. 1, a computer 10 includes a processor 14, one or more input devices 16 (such as a keyboard, mouse, touchscreen, etc.) and memory 20. The memory 20 stores an operating system 24 and a data type identifier correcting application 28. The data type identifier correcting application 28 can be implemented as a stand-alone application or as an add-in application 28' to a database application 29-1, a spreadsheet application 29-2, a data wrangling application 29-3, or other application that accesses data in the tables.

The computer 10 further includes a display subsystem 34 including a display 36 and bulk storage 40. In some examples, the bulk storage 40 includes nonvolatile memory such as solid-state memory or a hard disk drive that may be used to store tables that are accessed by the data type identifier correcting application 28. In some examples, the tables are associated with a database 44. The computer 10 may further include a network interface 46 such as a wired or wireless interface that communicates with a distributed communications system 50 such as the Internet. The computer 10 may access data (such as tables or a remote database 64) associated with a cloud services provider 60 or data (such as tables or a remote database 58) associated with a remote server 54.

Figure 2:
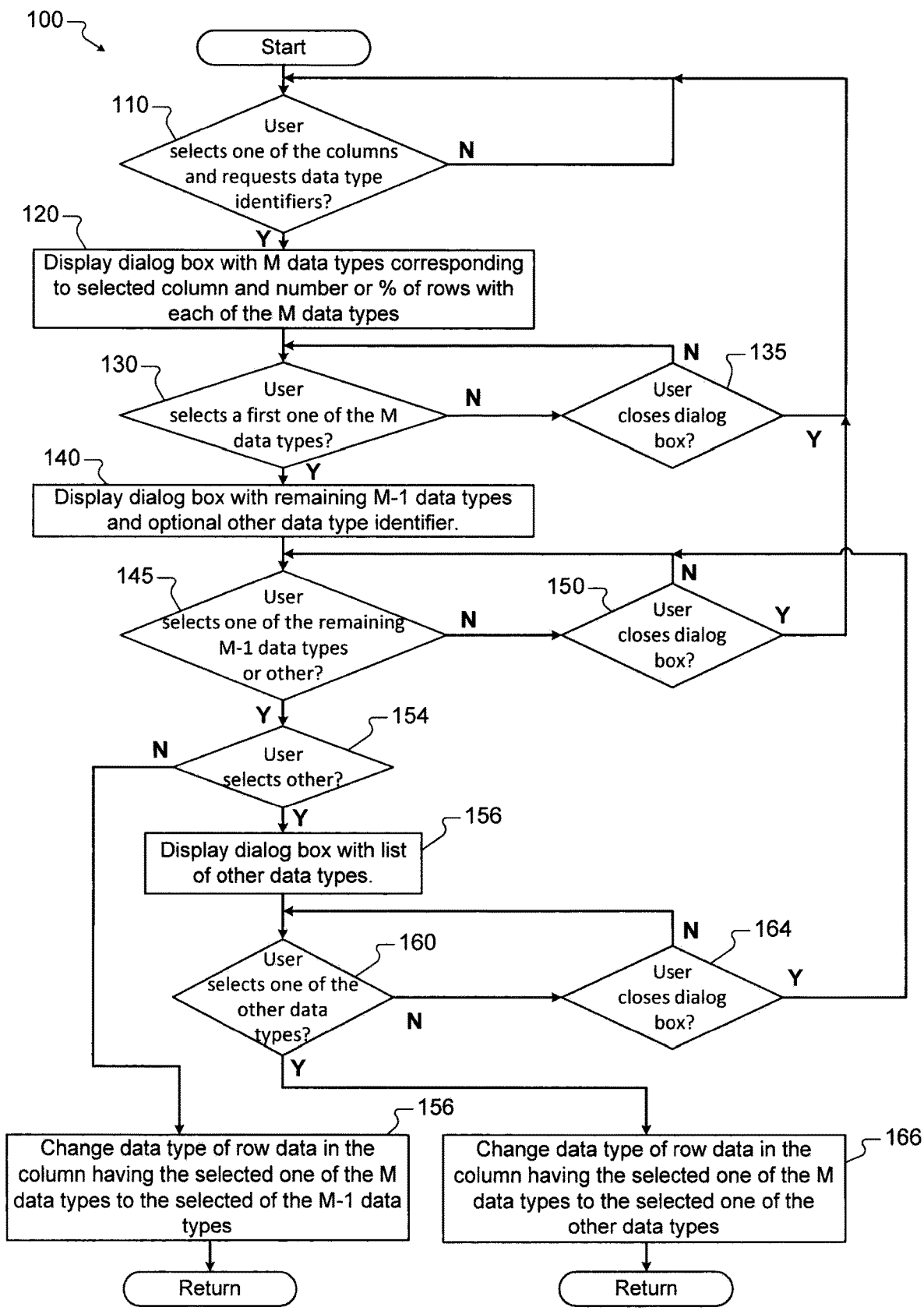
FIGS. 2-3 are flowcharts illustrating examples of a method for correcting data type identifiers according to the present disclosure.

Referring now to FIG. 2, a method 100 for operating the data type identifier correcting application 28 is shown. At 110, the user opens a table, selects one of the columns of the table and requests information relating to the data type identifiers in the column. In some examples, the user accesses menus or right-clicks on the column using the pointing device, although other selection methods may be used. A dialog box is presented to allow selection of one or more menu items, although other types of user interfaces may be used. At least one of the menu items includes changing data type identifiers for the selected column.

At 120, the data type identifier correcting application 28 displays a dialog box or other user interface with M data type identifiers appearing in the selected column and the number (or percentage) of rows in the selected column corresponding to each of the M data type identifiers, where M is an integer greater than one. At 130, the data type identifier correcting application 28 determines whether the user selects one of the M data type identifiers in the dialog box. If 130 is false, the method continues at 135 and determines whether the user has closed the dialog box. If 135 is true, the method returns to 110. If 135 is false, the method returns to 130.

When 130 is true, the method 100 continues at 140 and displays a dialog box with the remaining (M−1) data type identifiers in the selected column and an optional other data type. At 145, the method determines whether the user selects one of the remaining (M−1) data type identifiers or other data type. Selecting one of the remaining (M−1) data type identifiers can be used to initiate the change or a confirmation dialog box may be used before the change is completed.

If 145 is false, the method determines whether the user closes the dialog box at 150. If 150 is true, the method returns to 110. If 150 is false, the method returns to 145. When 145 is true, the method continues at 154 and determines whether the user selected the other data type. If 154 is false, the method changes the data type identifier of row data in the selected column having the selected one of the M data type identifiers to the selected one of the M−1 data type identifiers.

If 154 is true, the method displays a dialog box with a list of other data types at 156. For example, the list includes other data type identifiers that are available but not already represented in the rows of the selected column. Examples include traditional data type identifiers described above and/or data entities such as addresses, social security numbers, phone numbers, zip codes, etc. that have hybrid data formats or special data formats.

At 160, the method determines whether the user selects one of the other data types in the list. If 160 is false, the method determines whether the user closes the dialog box. If 164 is false, the method returns to 160. If 164 is true, the method continues at 145, 130 or 110. If 160 is true, the method changes the data type identifier of row data in the selected column having the selected one of the M data type identifiers to the selected one of the other data type identifiers.

As can be appreciated, the method 100 can be stopped or repeated until there is only a single data type identifier remaining in the selected column.

Figure 3:
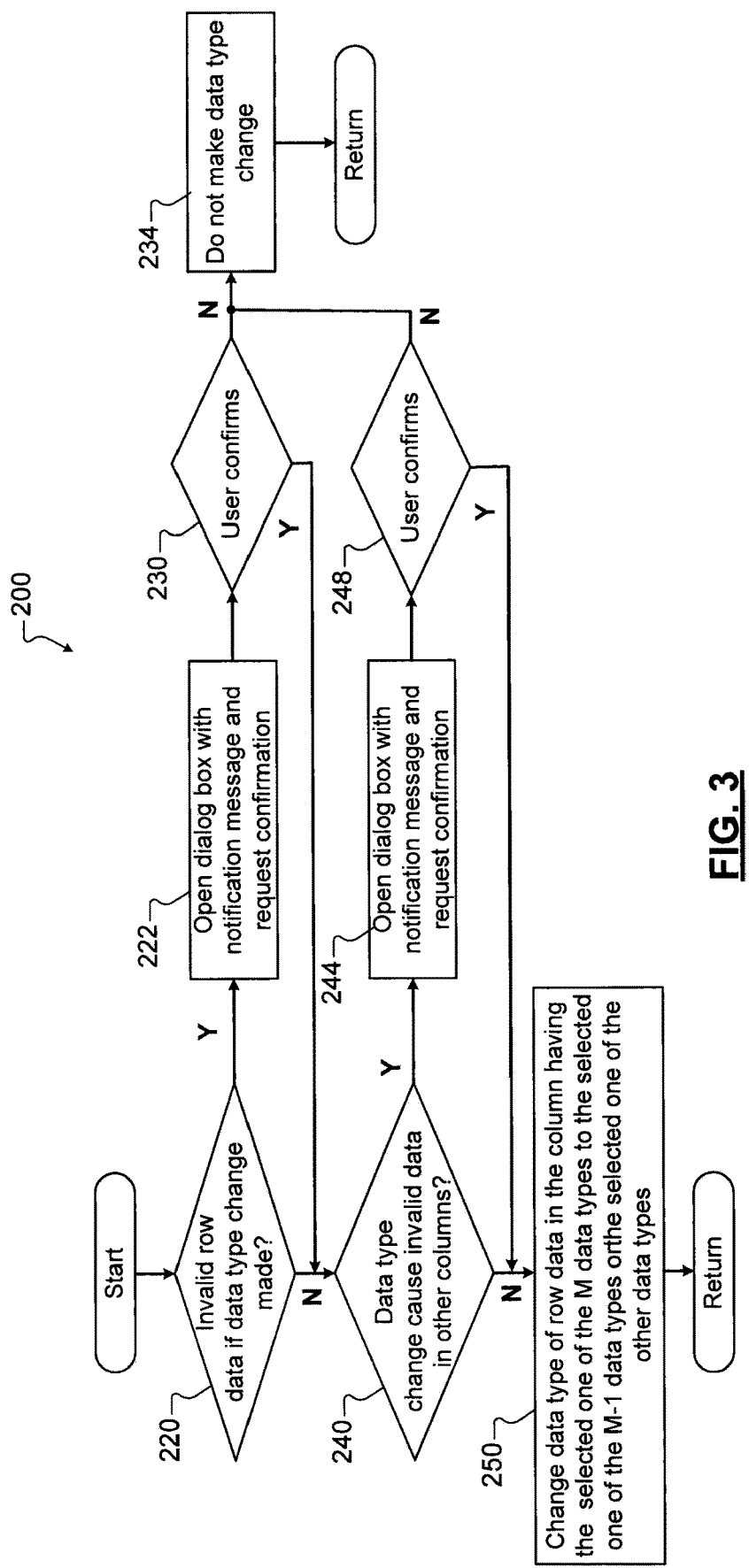

Referring now to FIG. 3, a method 200 for optionally providing additional functionality depending upon the outcome of the data type identifier change request in FIG. 2 is shown. At 220, the method determines whether there will be invalid data in one or more rows of the selected column if the requested data type identifier change is made. If 220 is true, the method 200 opens a dialog box with a notification message to inform the user and requests confirmation at 222. At 230, the method determines whether the user confirms. If 230 is true, the method continues with 240. If 230 is false, the data type identifier change is not performed at 234.

When 220 is false or 230 is true, the method 200 continues at 240 and determines whether the requested data type identifier change would cause invalid data in other columns (other than the currently selected column). If 240 is true, the method 200 opens a dialog box with a notification message at 244 and requests confirmation of the data type identifier change. At 248, if the user does not confirm, the data type identifier change is not made and the method continues at 234. If 240 is false or 248 is true, the method continues with 250. At 250, the method 200 changes the data type identifier of row data in the selected column having the selected one of the M data type identifiers to the selected one of the (M−1) data type identifiers or the selected one of the other data type identifiers.

Figure 4:
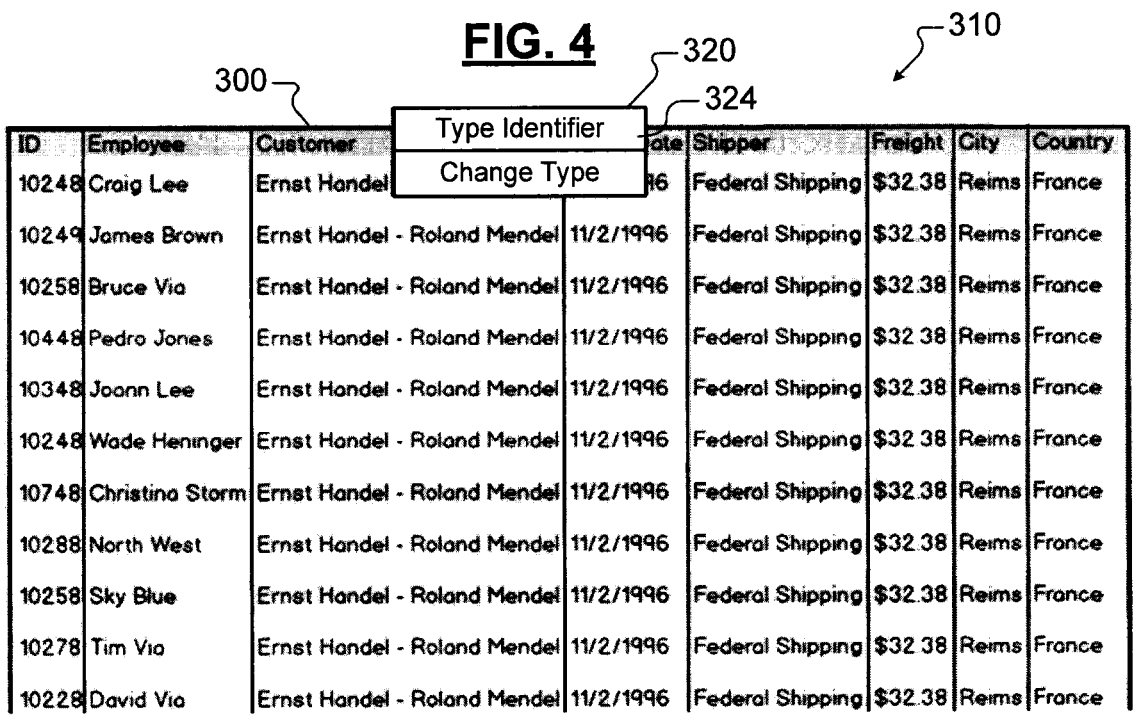

Referring now to FIGS. 4-9, an example of a user interface for changing the data type identifier of a column is shown. In FIG. 4, when a user selects a column 300 of a table 310, a dialog box 320 or other user interface is generated. The dialog box 320 includes one or more selectable command buttons 324.

Figure 5:
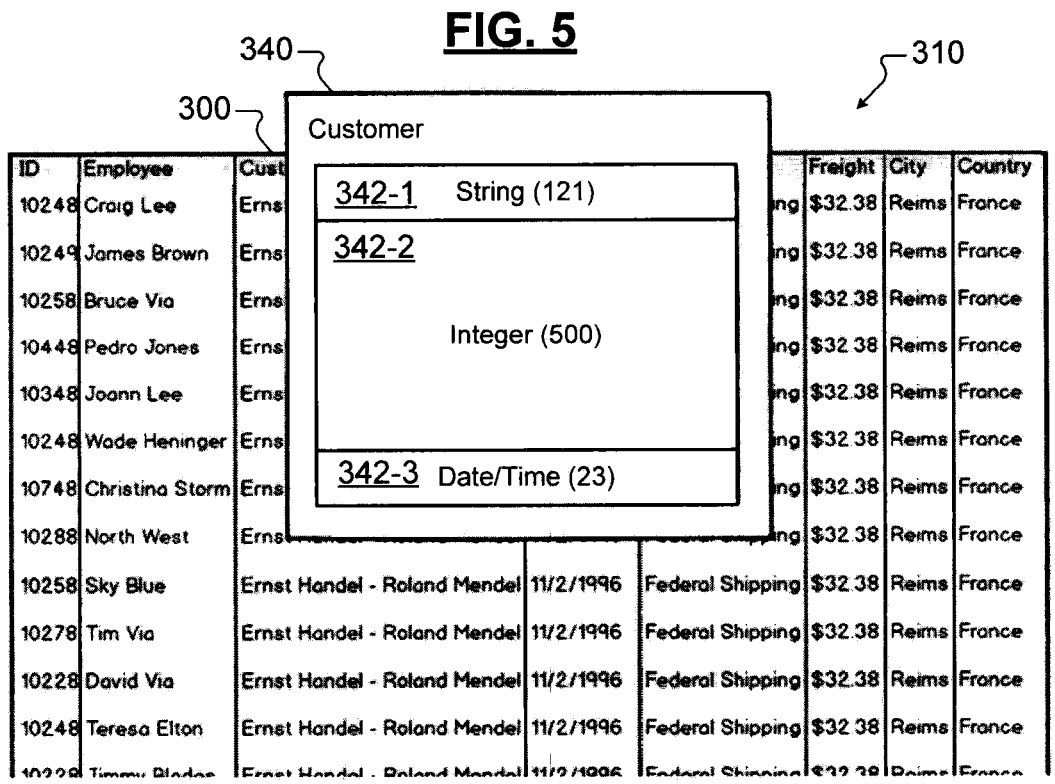

In FIG. 5, if the user selects one of the command buttons 324 of the dialog box 320, a dialog box 340 is presented and includes data type identifiers that are found in the selected column. In this example, there are 3 different data type identifiers including string, integer and date/time. The dialog box 340 includes command buttons 342-1, 342-2 and 342-3 with data type identifier descriptors and a count corresponding to the total number of row occurrences in the selected column for the corresponding data type identifier. In this example, there are 121 rows with the string data type identifier, 500 rows with the integer data type identifier and 23 rows with the date/time data type identifier. Providing the number of row occurrences helps the data wrangler decide whether or not to make a data type identifier change and/or to troubleshoot data type mismatch in the column.

In FIGS. 6-7, when a user positions a cursor over or otherwise selects the command button 342-1, a dialog box 355 or other user interface is presented that includes command buttons 346-1 and 346-2 corresponding to the remaining data type identifiers in the selected column and an optional other command button 346-X. In this example, the user selects a change from the string data type identifier to the integer data type identifier using the command button 346-1.

In FIG. 7, the dialog box 340 is updated and now includes the remaining data type identifiers after the data type identifier change was made. In this example, the string data type identifier no longer exists and the integer data type identifier is increased by the number of rows that were changed from the string data type identifier to the integer data type identifier. In this example, the integer data type identifier now corresponds to 621 rows of the column as shown in command button 342-4.

In FIGS. 8-9, the process can be repeated to make additional datatype identifier changes. A user can position the cursor or otherwise select the command button 342-3. A dialog box 350 is generated and includes the remaining data type identifiers in other rows and the optional other command button 346-X. The user selects a change to the integer data type identifier using the command button 350.

In FIG. 9, the dialog box 340 is updated and displays a command button 342-5 with a descriptor displaying the additional rows that now have the integer data type identifier. In this example, the 23 rows with the date/time data type identifier are now added to the rows with the integer data type identifier. As can be appreciated, the user can select the command button 342-5 and a dialog box (not shown) with the other command button 346-X can be presented to allow changes to a selected other data type identifier.

Figure 10:
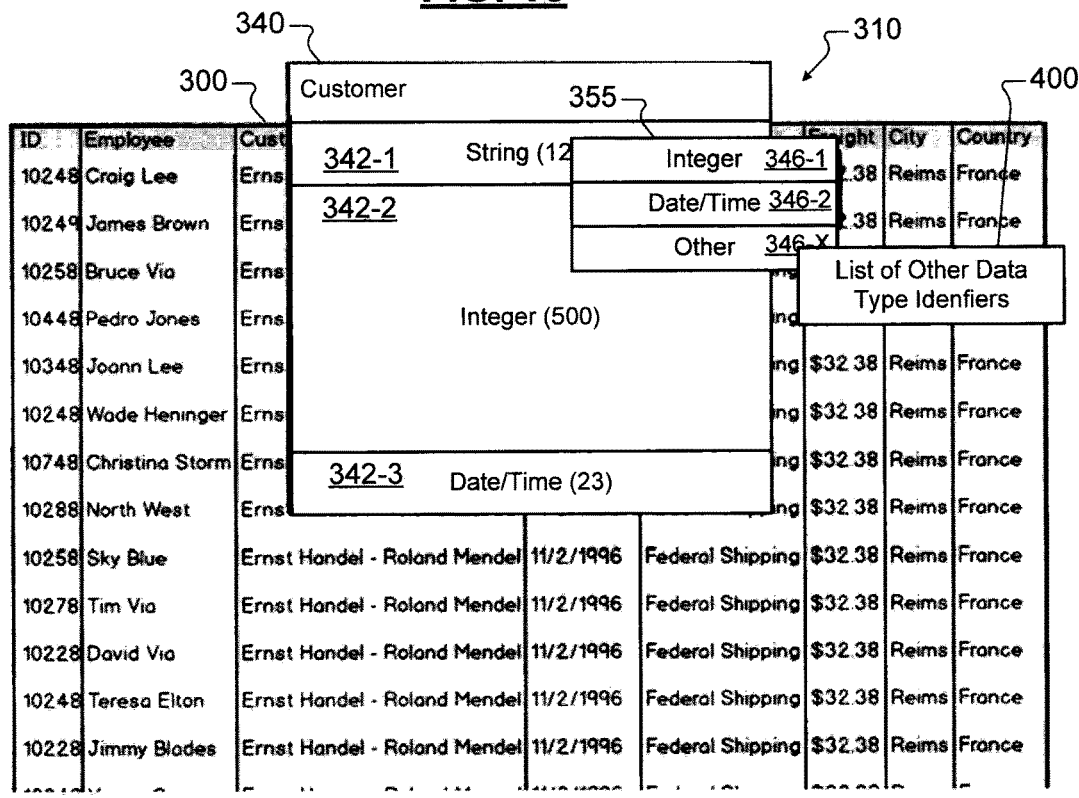
FIGS. 10-11 are screen shots illustrating example dialog boxes for changing the data type identifier of a column of a table to a data type identifier that is not associated with any data entries in rows of a selected column.
Figure 11:
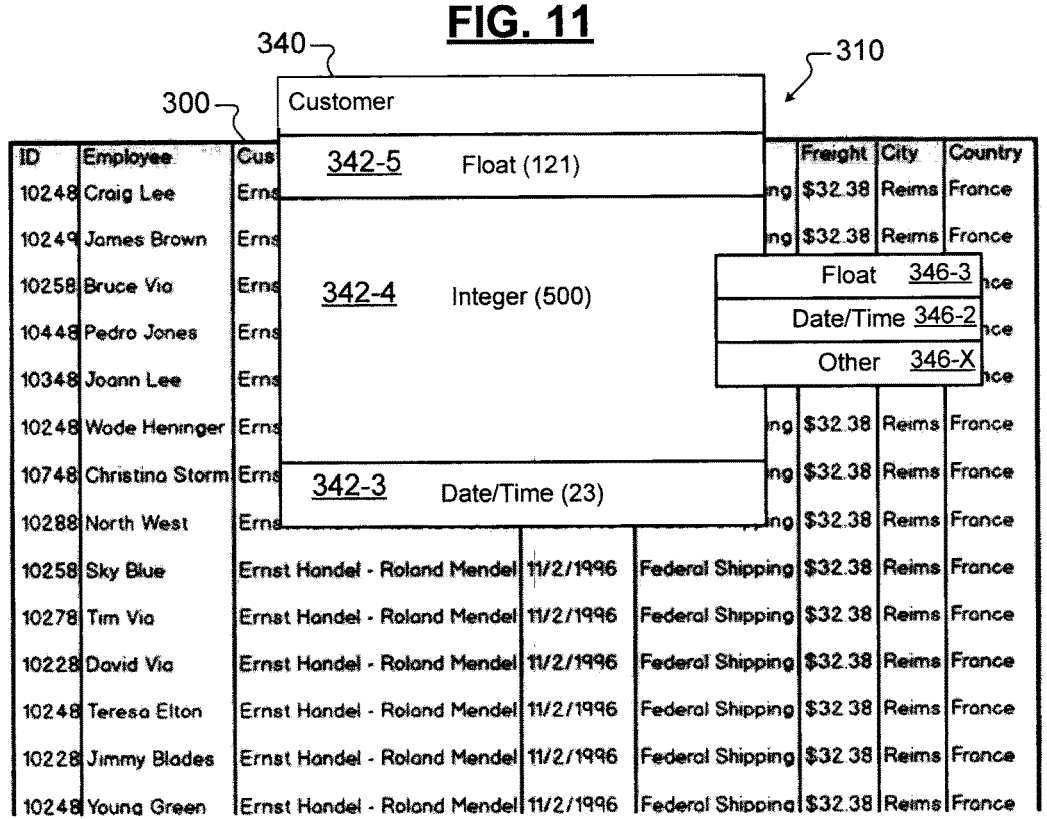

In FIGS. 10-11, the data type identifiers can be changed to a data type identifier (in FIG. 10) that is not in the list using the command button 346-X. When the command button 346-X is selected, a dialog box 400 is displayed and includes a list of other data type identifiers that can be selected. Each item in the list may correspond to a command button. Alternately, a drop-down box or other selection process may be used.

In the example in FIG. 11, the user selects a float data type identifier and the data entries corresponding to the string data type identifier are changed to the float data type 342-5. The process can be repeated for other data type identifiers such as the integer data type identifier 342-4 in FIG. 11.

Figures 12, 13:
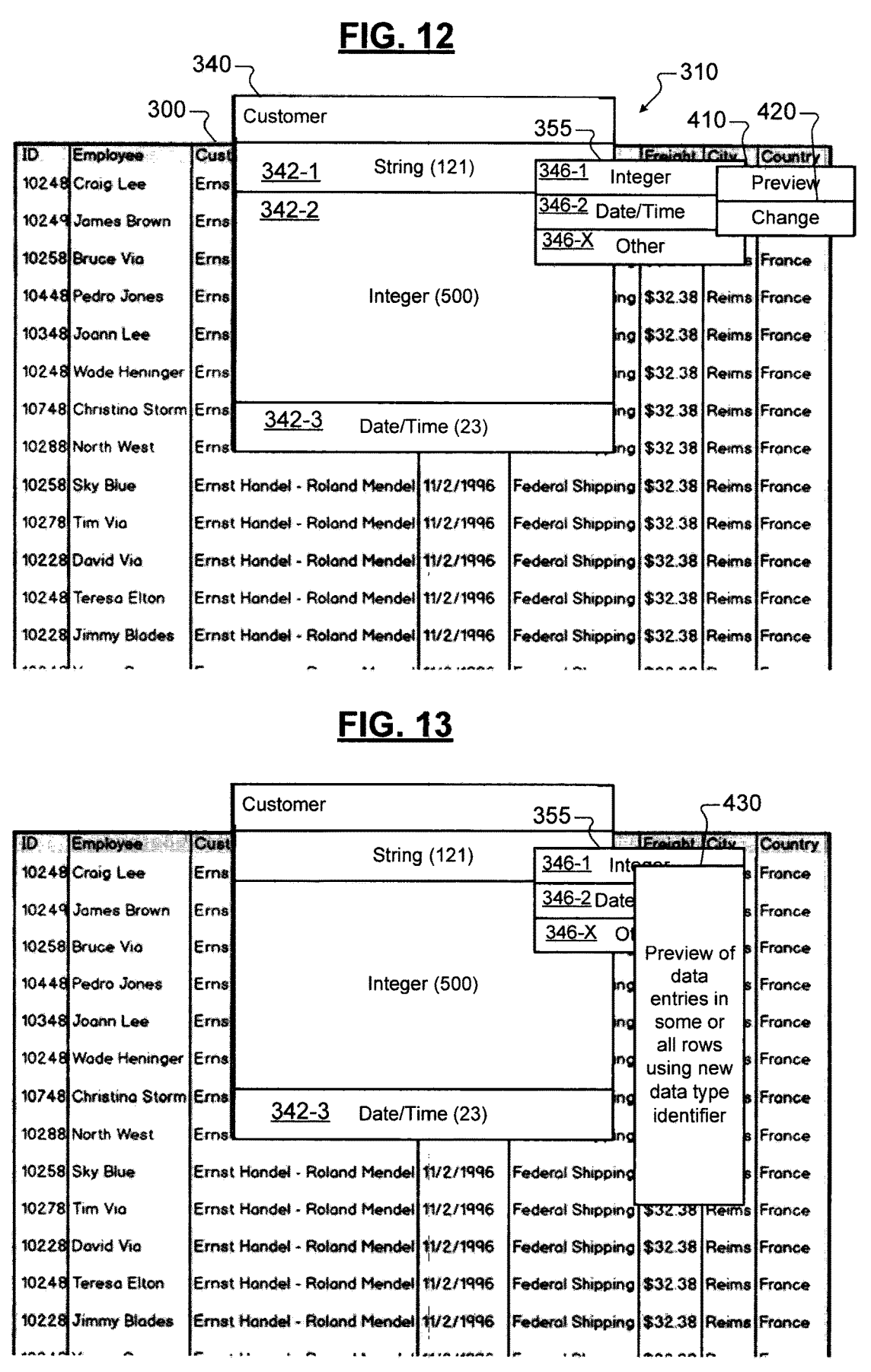

Referring now to FIGS. 12-13, data entries in rows corresponding to a data type identifier that the user intends to change can be previewed. When a user clicks on one of the command buttons 346-1, 346-2 and 346-X, the user can select either a preview command button 410 or a change command button 420. If the preview button 420 is selected, a display box 430 in FIG. 13 is presented that shows a preview of some or all of the data entries in rows as if the change was made. If the user decides that the correct result occurred, the change can be made.

Referring now to FIGS. 14-15, data entries in rows corresponding to a data type identifier can be sampled to see what the data entries look like. When a user clicks on one of the command buttons 342-1, 342-2 and 342-3 to change the data type identifier, the user can select a command button 346-S to generate a display box with samples of data entries in rows corresponding to the selected data type identifier in the list. If the sample command button 346-S is selected, a display box 450 in FIG. 15 is presented that shows a sample of some or all of the data entries in rows corresponding to the data entries in rows corresponding to the selected data type identifier in the list.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (EON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a processor and memory;
    an operating system executed by the processor and memory;
    a data type identifier changing application that is executed by the operating system and that is configured to:
        provide, via a graphical user interface on a device, a display of a table including data entries that are arranged in rows and columns, wherein each data entry in the table is assigned a data type identifier identifying a type of data for a value in the corresponding data entry;
        detect a selection of a column of data entries from the table;
        determine mismatched data type identifiers within the selected column of data entries based on a first subset of data entries from the column of data entries being associated with a first data type and a second subset of data entries from the column of data entries being associated with a second data type, wherein the mismatched data type identifiers refer to different datatypes where one of the different datatypes is incompatible with performing operations that call for one of the first data type and the second data type; and
        based on determining the mismatched data type identifiers between the first subset of data entries and the second subset of data entries, causing the first datatype associated with the first subset of data entries to be reassigned to the second datatype, wherein causing the first datatype to be reassigned includes:
            generating a list of two or more datatype identifiers corresponding to the mismatched datatype identifiers within the selected group of data entries, the list including a first indicator of the first data type and a second indicator of the second data type;
            providing a display of a selectable command to reassign a first data type identifier for each entry from the first subset of entries to a second data type identifier corresponding to the second subset of entries; and
            based on a detected selection of the selectable command, reassigning the first data type identifier for each entry from the first subset of entries to the second data type identifier to correct at least one of the two or more mismatched data type identifiers within the selected group of data entries.

2. The system of claim 1, wherein the data type identifier changing application generates row counts corresponding to a number of rows in the selected column having a corresponding one of the two or more data type identifiers and displays the row counts in the list.

3. The system of claim 1, wherein at least one data type identifier from the two or more data type identifiers include data entities selected from one or more of an address, a social security number, a phone number, or a zip code.

4. The system of claim 1, wherein the data type identifier changing application iteratively performs acts of providing displays of the table, detecting selections of the column of data entries, determining one or more additional mismatched data type identifiers within detected selections of the column of data entries, generating one or more additional lists of multiple datatype identifiers corresponding to the one or more additional mismatched data type identifiers, providing additional displays of selectable commands to reassign data type identifiers, and reassigning one or more additional data type identifiers until only one data type identifier is associated with each data entry from the selected column of data entries from the table.

5. The system of claim 1, wherein the data type identifier changing application is configured as an add-in application to an application selected from one or more of a database application, a spreadsheet application, or a data wrangling application.

6. The system of claim 1, wherein the data type identifier changing application selectively displays sample data entries in rows of one of the two or more data type identifiers in the list.

7. The system of claim 1, wherein the list is displayed in a dialog box including a plurality of command buttons corresponding to the two or more data type identifiers.

8. The system of claim 7, wherein of the selectable command includes a text descriptor for a corresponding one of the two or more data type identifiers, the text descriptor including a count of rows for the corresponding one of the two or more data type identifiers.

9. A non-transitory, tangible computer-readable medium storing instructions for changing data type identifiers, the non-transitory, tangible computer-readable medium comprising instructions for:
    providing, via a graphical user interface on a device, a display of a table including data entries that are arranged in rows and columns, wherein each data entry in the table is assigned a data type identifier identifying a type of data for a value in the corresponding data entry;
    detecting a selection of a column of data entries from the table;
    determining mismatched data type identifiers within the selected column of data entries based on a first subset of data entries from the column of data entries being associated with a first data type and a second subset of data entries from the column of data entries being associated with a second data type, wherein the mismatched data type identifiers refer to different datatypes where one of the different datatypes is incompatible with performing operations that call for one of the first data type and the second data type; and based on determining the mismatched data type identifiers between the first subset of data entries and the second subset of data entries, causing the first datatype associated with the first subset of data entries to be reassigned to the second datatype, wherein causing the first datatype to be reassigned includes:

generating a list of two or more datatype identifiers corresponding to the mismatched datatype identifiers within the selected group of data entries, the list including a first indicator of the first data type and a second indicator of the second data type;

providing a display of a selectable command to reassign a first data type identifier for each entry from the first subset of entries to a second data type identifier corresponding to the second subset of entries; and based on a detected selection of the selectable command, reassigning the first data type identifier for each entry from the first subset of entries to the second data type identifier to correct at least one of the two or more mismatched data type identifiers within the selected group of data entries.

10. The non-transitory, tangible computer-readable medium of claim 9, further comprising instructions for:
generating row counts corresponding to a number of rows in the selected column having a corresponding one of the two or more data type identifiers; and
displaying the row counts in the list.

11. The non-transitory, tangible computer-readable medium of claim 9, wherein at least one data type identifier from the two or more data type identifiers include data entities selected from one or more of an address, a social security number, a phone number, and a zip code.

12. The non-transitory, tangible computer-readable medium of claim 9, further comprising instructions for iteratively performing acts of providing displays of the table, detecting selections of the column of data entries, determining one or more additional mismatched data type identifiers within detected selections of the column of data entries, generating one or more additional lists of multiple datatype identifiers corresponding to the one or more additional mismatched data type identifiers, providing additional displays of selectable commands to reassign data type identifiers, and reassigning one or more additional data type identifiers until only one data type identifier is associated with each data entry from the selected column of data entries from the table.

13. The non-transitory, tangible computer-readable medium of claim 9, further comprising instructions for:
displaying the list of the data type identifiers in a dialog box including a plurality of command buttons corresponding to the two or more data type identifiers in the list;
generating text descriptors for each corresponding one of the two or more data type identifiers in the list; and
generating a count of rows for the corresponding one of the two or more data type identifiers and displaying the count in the text descriptors for each corresponding one of the two or more data type identifiers.

14. The non-transitory, tangible computer-readable medium of claim 9, further comprising instructions for selectively displaying sample data entries in rows of one of the two or more data type identifiers in the list.

15. The non-transitory, tangible computer-readable medium of claim 9, further comprising instructions for selectively displaying a preview of reassigned data entries in rows corresponding to the second data type of the two or more data type identifiers in the list.

16. A system comprising
a processor and memory;
an operating system executed by the processor and memory;
a data type identifier changing application that is executed by the operating system and that is configured to:
provide, via a graphical user interface on a device, a display of a table including data entries that are arranged in rows and columns, wherein each data entry in the table is assigned a data type identifier identifying a type of data for a value in the corresponding data entry;
detecting a selection of a column of data entries from the table;
determine mismatched data type identifiers within the selected column of data entries based on a first subset of data entries from the column of data entries being associated with a first data type and a second subset of data entries from the column of data entries being associated with a second data type, wherein the mismatched data type identifiers refer to different datatypes where one of the different datatypes is incompatible with performing operations that call for one of the first data type and the second data type; and
based on determining the mismatched data type identifiers between the first subset of data entries and the second subset of data entries, causing the first datatype associated with the first subset of data entries to be reassigned to the second datatype, wherein causing the first datatype to be reassigned includes:
generating a list of two or more datatype identifiers corresponding to the mismatched datatype identifiers within the selected group of data entries, the list including a first indicator of the first data type and a second indicator of the second data type;
generating row counts corresponding to a number of rows in the selected column having a corresponding one of the two or more data type identifiers and display the row counts along with the list of the two or more data type identifiers; and
reassigning the first data type identifier for each entry from the first subset of data entries to the second data type identifier to correct at least one of the two or more mismatched data type identifiers within the selected column.

17. The system of claim 16, wherein at least one data type identifier from the two or more data type identifiers include data entities selected from one or more of an address, a social security number, a phone number, or a zip code.

18. The system of claim 16, wherein the data type identifier changing application is configured as an add-in application to an application selected from one or more of a database application, a spreadsheet application, or a data wrangling application.

19. The method of claim 1, further comprising:
determining whether reassigning the first data type identifier to the second data type identifier for any of the first subset of data entries would cause invalid data in one or more additional columns of the table, wherein reassigning the first data type identifier for each entry is further based on whether reassigning the first data type identifier to the second data type identifier for any of the first subset of data entries would cause invalid data in one or more additional columns of the table.

20. The system of claim 16, wherein causing the first datatype to be reassigned responsive to determining the mismatched data type identifiers between the first subset of data entries and the second subset of data entries further comprises:

determining whether reassigning the first data type identifier to the second data type identifier for any of the first subset of data entries would cause invalid data in one or more additional columns of the table; and reassigning the first data type identifier for each entry further based on determining that reassigning the first data type identifier to the second data type identifier would not cause invalid data in one or more additional columns of the table.

\* \* \* \* \*